(12) United States Patent
Wang et al.

(10) Patent No.: US 11,563,945 B2
(45) Date of Patent: Jan. 24, 2023

(54) ADAPTIVE OFFSET FOR VARIANCE BASED QUANTIZATION

(71) Applicants: Advanced Micro Devices, Inc., Santa Clara, CA (US); ATI Technologies ULC, Markham (CA)

(72) Inventors: Jiao Wang, Markham (CA); Ying Zhang, Markham (CA); Richard George, Santa Clara, CA (US); Edward A. Harold, Markham (CA); Zhenhua Yang, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 16/588,975

(22) Filed: Sep. 30, 2019

(65) Prior Publication Data

US 2021/0099705 A1   Apr. 1, 2021

(51) Int. Cl.
| | |
|---|---|
| *H04N 19/124* | (2014.01) |
| *H04N 19/13* | (2014.01) |
| *H04N 19/146* | (2014.01) |
| *H04N 19/172* | (2014.01) |
| *H04N 19/176* | (2014.01) |
| *H04N 19/182* | (2014.01) |
| *H04N 19/196* | (2014.01) |

(52) U.S. Cl.
CPC ........... *H04N 19/124* (2014.11); *H04N 19/13* (2014.11); *H04N 19/146* (2014.11); *H04N 19/172* (2014.11); *H04N 19/176* (2014.11); *H04N 19/182* (2014.11); *H04N 19/196* (2014.11); *H04N 19/198* (2014.11)

(58) Field of Classification Search
CPC .... H04N 19/124; H04N 19/13; H04N 19/146; H04N 19/172; H04N 19/176; H04N 19/182; H04N 19/196; H04N 19/198
USPC ........................................................ 375/240
See application file for complete search history.

(56) References Cited

U.S. PATENT DOCUMENTS

| | | | |
|---|---|---|---|
| 2015/0071345 A1* | 3/2015 | Tourapis ................ | H04N 19/30 375/240.03 |
| 2016/0088298 A1* | 3/2016 | Zhang ................... | H04N 19/126 375/240.03 |
| 2018/0048901 A1* | 2/2018 | Zhang ................... | H04N 19/124 |
| 2018/0184092 A1* | 6/2018 | Jung .................... | H04N 19/147 |
| 2019/0116361 A1* | 4/2019 | Rusanovskyy ....... | H04N 19/463 |
| 2019/0132591 A1* | 5/2019 | Zhang ................... | H04N 19/172 |

* cited by examiner

*Primary Examiner* — Susan E. Torgerson (74) *Attorney, Agent, or Firm* — Volpe Koenig (57) ABSTRACT

A technique for determining an adaptive quantization parameter offset for a block of encoded video includes obtaining a rate control factor for the quantization parameter, determining a content-based quantization parameter factor for the quantization parameter, determining an adaptive variance based quantization offset based on content-based quantization parameter factors for a frame prior to the current frame, and combining the rate control factor, the content-based quantization parameter factor, and the adaptive offset to generate the quantization parameter.

20 Claims, 5 Drawing Sheets

ADAPTIVE OFFSET FOR VARIANCE BASED QUANTIZATION

BACKGROUND

One aspect of video encoding involves conversion of pixels in a frame of video into groups of pixels, often known as blocks. A lossy compression step downgrades the fidelity of the representation of the blocks. The amount of data used for any particular block is based at least in part on a quantization parameter set for that block. Techniques for setting the quantization parameter for blocks are constantly being developed.

BRIEF DESCRIPTION OF THE DRAWINGS

A more detailed understanding is gained from the following description, given by way of example in conjunction with the accompanying drawings wherein.

DETAILED DESCRIPTION

A technique for determining a quantization parameter for a block of encoded video is provided. The technique includes obtaining a rate control factor for the quantization parameter, determining a content-based quantization parameter factor for the quantization parameter, determining an offset based on content-based quantization parameter factors for a frame prior to the current frame, and combining the rate control factor, the content-based quantization parameter factor, and the offset to generate the quantization parameter.

Figure 1:
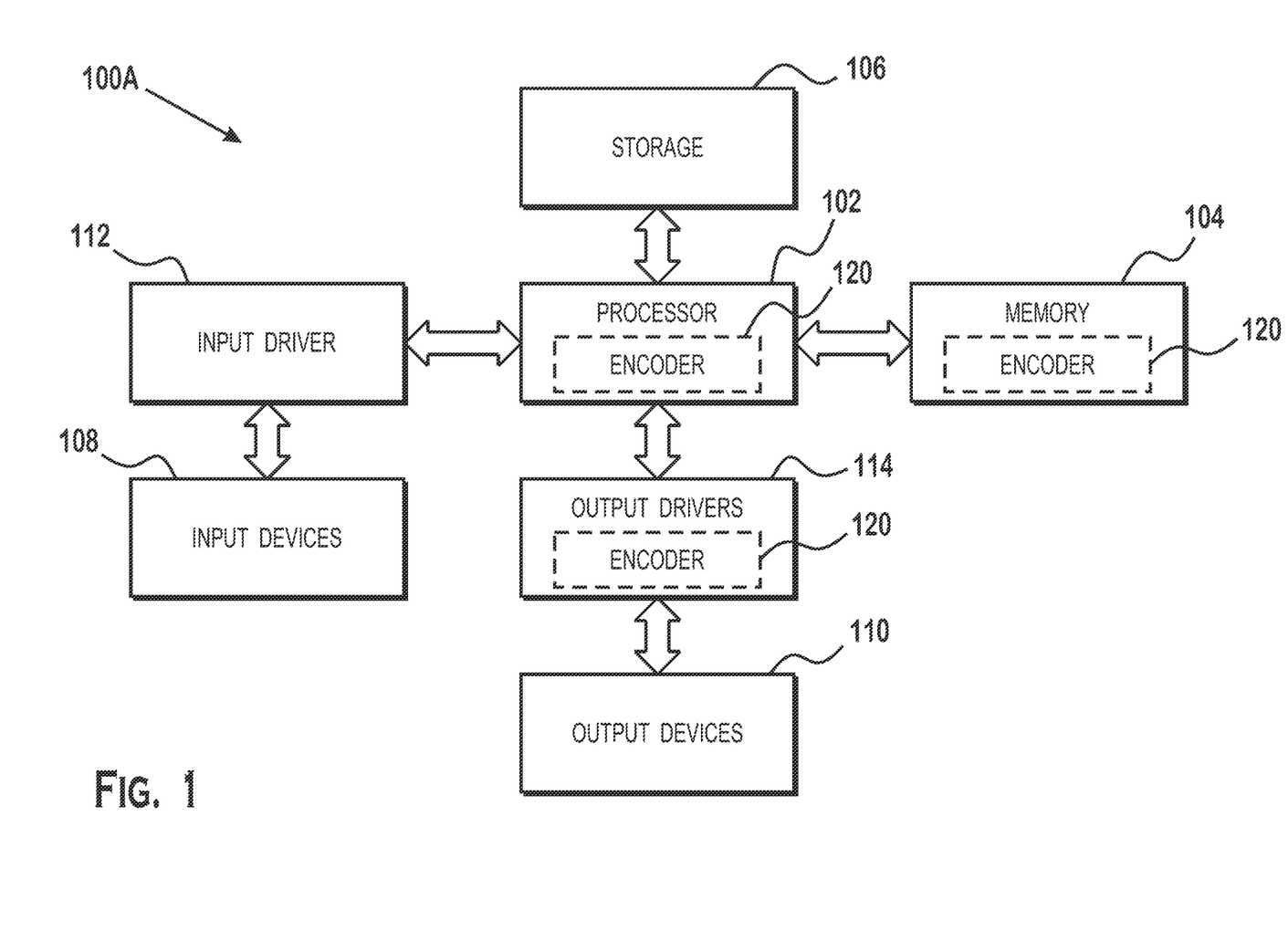
FIG. 1 is a block diagram of an example device in which aspects of the present disclosure are implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 optionally includes an input driver 112 and an output driver 114. It is understood that the device 100 optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

A video encoder 120 is shown in two different alternative forms. In a first form, the encoder 120 is software that is stored in the memory 104 and that executes on the processor 102 as shown. In a second form, the encoder 120 is at least a portion of a hardware graphics engine that resides in output drivers 114. In other forms, the encoder 120 is a combination of software and hardware elements, with the hardware residing, for example, in output drivers 114, and the software executed on, for example, the processor 102.

Figure 2A:
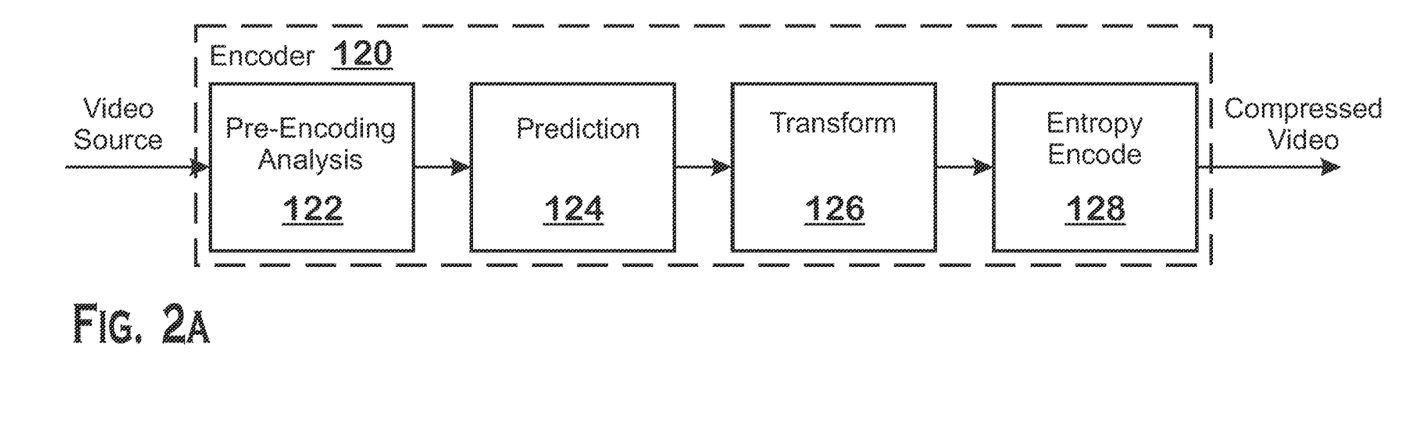
FIG. 2A presents a detailed view of an encoder, according to an example.

FIG. 2A presents a detailed view of the encoder 120 of FIG. 1, according to an example. The encoder 120 accepts source video, encodes the source video to produce compressed video (or "encoded video"), and outputs the compressed video. The encoder 120 includes a pre-encoding analysis block 122, a prediction block 124, a transform block 126, and an entropy encode block 128. In some alternatives, the encoder 120 implements one or more of a variety of video encoding standards (such as MPEG2, H-.264, or other standards), with the prediction block 124, transform block 126, and entropy encode block 128 performing respective portions of those standards. In other alternatives, the encoder 120 implements a video encoding technique that is not a part of any standard.

The prediction block 124 performs prediction techniques to reduce the amount of explicit information needed to be stored for a particular frame. Various prediction techniques are possible. One example of a prediction technique is a motion prediction based inter-prediction technique, where a block in the current frame is compared with different groups of pixels in a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with the best score such as the lowest sum of absolute differences is deemed to be a match. After finding a matching block, the current block is subtracted from the matching block to obtain a residual. The residual is further encoded by the transform block 126 and the entropy encode block 128 and the block is stored as the encoded residual plus the motion vector in the compressed video.

The transform block 126 performs an encoding step which is typically lossy, and converts the pixel data of the block into a compressed format. An example transform that is typically used is a discrete cosine transform (DCT). The discrete cosine transform converts the block into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a higher QP requires fewer bits. Visually, a higher QP is associated with less detail and a lower QP is associated with more detail.

The entropy encode block 128 performs entropy coding on the coefficients of the blocks. Entropy coding is a lossless form of compression. Examples of entropy coding include context-adaptive variable-length coding and context-based adaptive binary arithmetic coding. The entropy coded transform coefficients describing the residuals, the motion vectors, and other information such as per-block QPs are output and stored or transmitted as the encoded video.

The pre-encoding analysis block 122 performs analysis on the source video to adjust parameters used during encoding. One operation performed by the pre-encoding analysis block 122 includes determining what quantization parameter values should be afforded to the blocks for encoding. Additional details about determining quantization parameter values for encoding blocks are provided below.

Figure 2B:
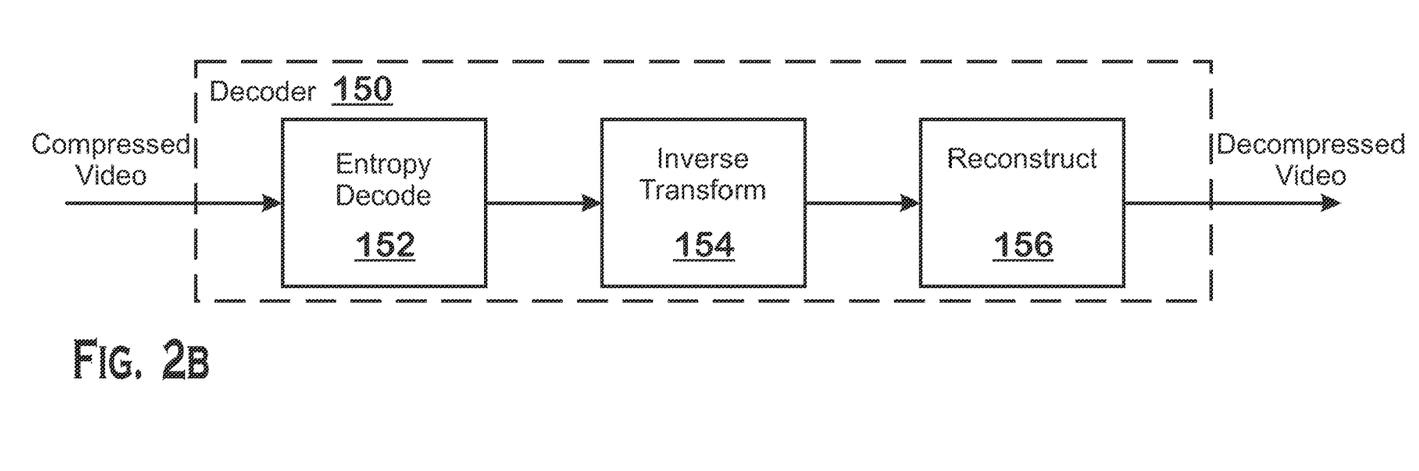
FIG. 2B presents a detailed view of a decoder, according to an example.

FIG. 2B represents a decoder 150 for decoding compressed data generated by an encoder such as the encoder 120, according to an example. The decoder 150 includes an entropy decoder 152, an inverse transform block 154. The entropy decoder 152 converts the entropy encoded information in the compressed video, such as compressed quantized transform coefficients, into raw (non-entropy-coded) quantized transform coefficients. The inverse transform block 154 converts the quantized transform coefficients into the residuals. The reconstruct block 156 obtains the predicted block based on the motion vector and adds the residuals to the predicted block to reconstruct the block.

Note that the operations described for FIGS. 2A and 2B only represent a small subset of the operations that encoder and decoder use. In various implementations, the encoder and decoder use various alternative or additional operations.

Figure 3:
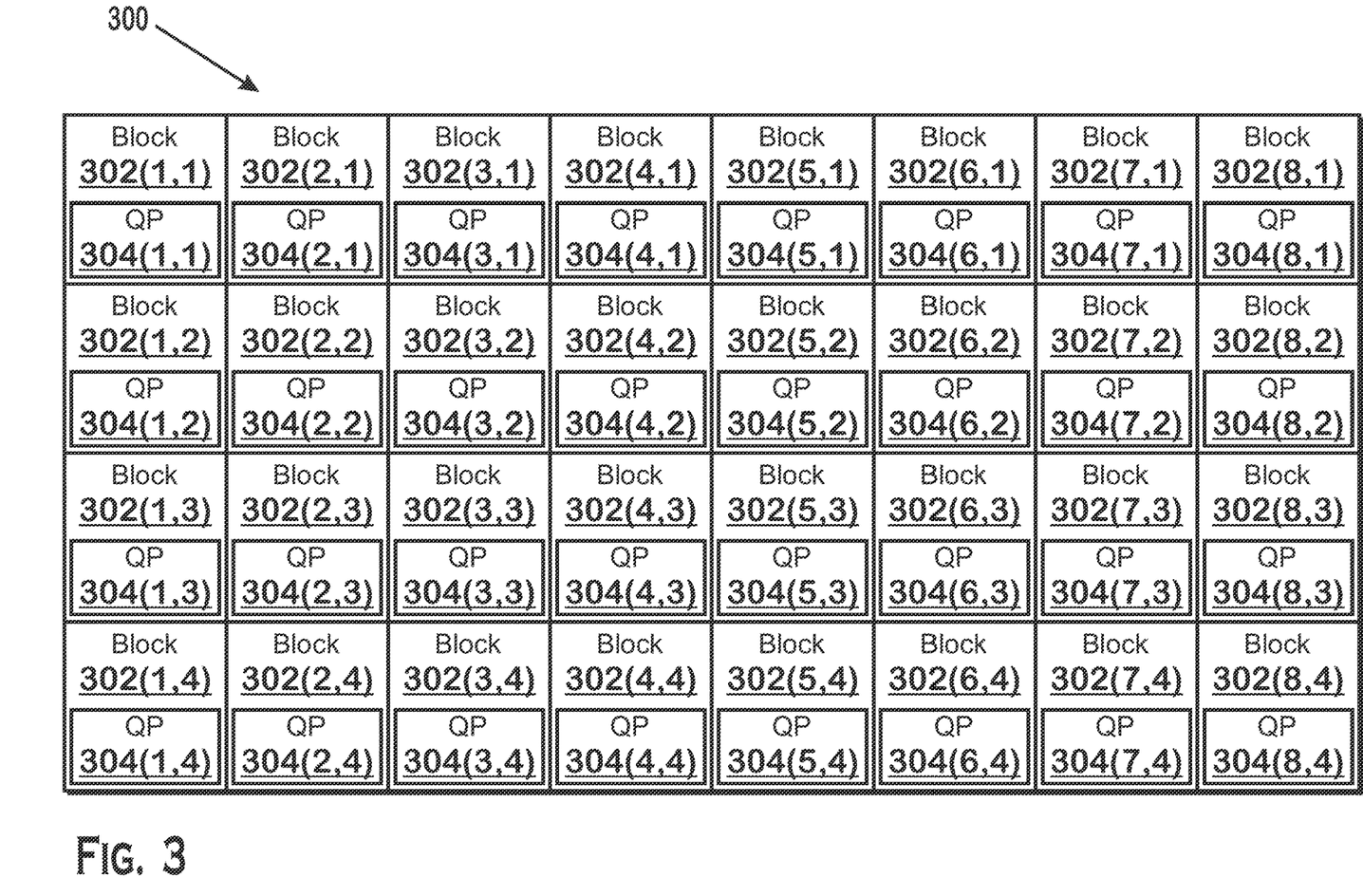
FIG. 3 illustrates an example frame, illustrating blocks of the frame and quantization parameters for the blocks.

FIG. 3 illustrates an example frame 300, illustrating blocks 302 of the frame and quantization parameters 304 for the blocks. The pre-encoding analysis block 122 determines parameters referred to as delta quantization parameter ("delta QP") and "offset" (described in further detail elsewhere herein) for the blocks of a frame, where the delta QP and offset are used in conjunction with a rate control quantization parameter ("QPrc") to set the final quantization parameter for blocks. The rate control quantization parameter is defined by a rate control block (not shown) implementing a rate control operation to determine the QPrc. Specifically, because the quantization parameters determine the amount of data required to store the blocks of a frame, and thus the frame itself, modifying the quantization parameters controls the bitrate of the video. The pre-encoding analysis block 122 thus sets the delta QP and offset based on previously encoded frame statistics and current frame variance values.

More specifically, the pre-encoding analysis block 122 determines a content-dependent factor for each block. The content-dependent factor is a value for a block that is based on the content of the block. In some implementations, the content-dependent factor for a block is based on the statistical variance of the pixel data of the block. In an example, the pre-encoding analysis block 122 calculates the content-dependent factor, referred to herein as "deltaQP" as: $\log_2$ $_{(var(y,\ 16)+var(u,\ 8)+var(v,\ 8))}$. In this equation for deltaQP, y, u, and v are luminance (y) and chrominance (u and v) pixel component values. Var(pix_val, n) is the variance for a particular pixel component value (y, u, or v), for a particular n×n group of pixels. In the example shown, the variance calculated for luminance (y) is calculated for a larger block of pixels than the variance calculated for the chrominance values u and v. The size of the block for which the deltaQP value is calculated is the smallest of the block sizes for which the variances are calculated. In the example shown, that block size is 16×16. However, in other implementations, different sized blocks are used and/or different-sizes over which pixel component values are calculated are used. In addition, although the component values illustrated are luminance and chrominance yuv values, any pixel values could be used for the purpose of calculating variances and deltaQP.

In one example, the variance for a pixel component value "pix val" is calculated as follows:

$$var(pix\_val,\ n) = \sum_{x,y=0}^{x,y<n} (pix\_val(x,\ y) \times pix\_val(x,\ y)) - \frac{\sum_{x,y=0}^{x,y<n} pix_{val(x,y)} \times \sum_{x,y=0}^{x,y<n} pix_{val(x,y)}}{n \times n}.$$

In the above equation the variance for a pixel component value in an n×n block is calculated as the difference between the sum, for the n×n block, of each pixel component value squared and the square of the sum of each pixel component value in the n×n block divided by the number of pixels in the block. Although one way for calculating the content based value deltaQP is described, it should be understood that in various implementations, other ways for calculating deltaQP, which is based on the distribution of pixel component values, are used. Specifically, in various implementations, any technique for determining a deltaQP that decreases as the pixel component values become less uniform and increases as the pixel component values become more uniform is alternatively used. More specifically, within a frame, it is advantageous to encode blocks with more uniform (less variance) pixel values with a lower QP, and thus more data, because the human visual system notices degradation in visual quality of more uniform blocks to a greater degree than degradation in visual quality of less uniform blocks (higher variance). In other words, it is advantageous to afford a higher number of encoding bits to more uniform portions of a frame than to less uniform portions of a frame.

So far, the rate control quantization parameter (QPRc) and the deltaQP have been described as contributing to the final QP for the blocks. The rate control quantization parameter represents a QP for achieving a particular bitrate for a frame. The deltaQP is a content-based adjustment to vary the QP for blocks depending on the content of those blocks. Note, however, that adding the deltaQP to the rate-control based QP can modify the total bitrate of a frame from the bitrate specified by the QPRc parameter. Human eyes are more sensitive to the distortions in a relatively smooth region than a complex region. To make sure of this characteristic to improve video coding performance, a variance-based quantization technique is used. According to the variance-based quantization technique, larger quantization parameters are used for areas with larger variance to lower the quality. Using larger QP for larger variance areas leaves more of the bit budget for smooth areas, allowing such areas to be encoded with a lower QP, which improves the overall perceptual video quality to the human eyes. In the equation below, the quantization parameter is equal to the QPrc for the block added to the deltaQP for a block and to the offset for a frame.

$$QP_{block}=QP_{RCblock}+\text{delta}QP_{block}+\text{offset}_{frame}$$

In other words, in this implementation, the QP for a block is the sum of the rate control QP for the block, the deltaQP for the block, and the offset for the frame. Note that the offset is the same for each block 302 in a frame. It is possible to use a constant offset—i.e., the same exact offset value for each frame. However, a constant offset suffers from the following issue. In some instances, frames have a very large number of blocks with low variance or high variance. Thus the QPblock determined per the above expression, with a constant offset, would deviate too far from the desired bitrate. For example, a frame with most blocks having low pixel variance would have a low average deltaQP for the blocks, which would result in the average block QP being lower than a frame with more distributed blocks variances, and resulting in a higher than "anticipated" or "desired" bitrate for the frame.

Figure 4:
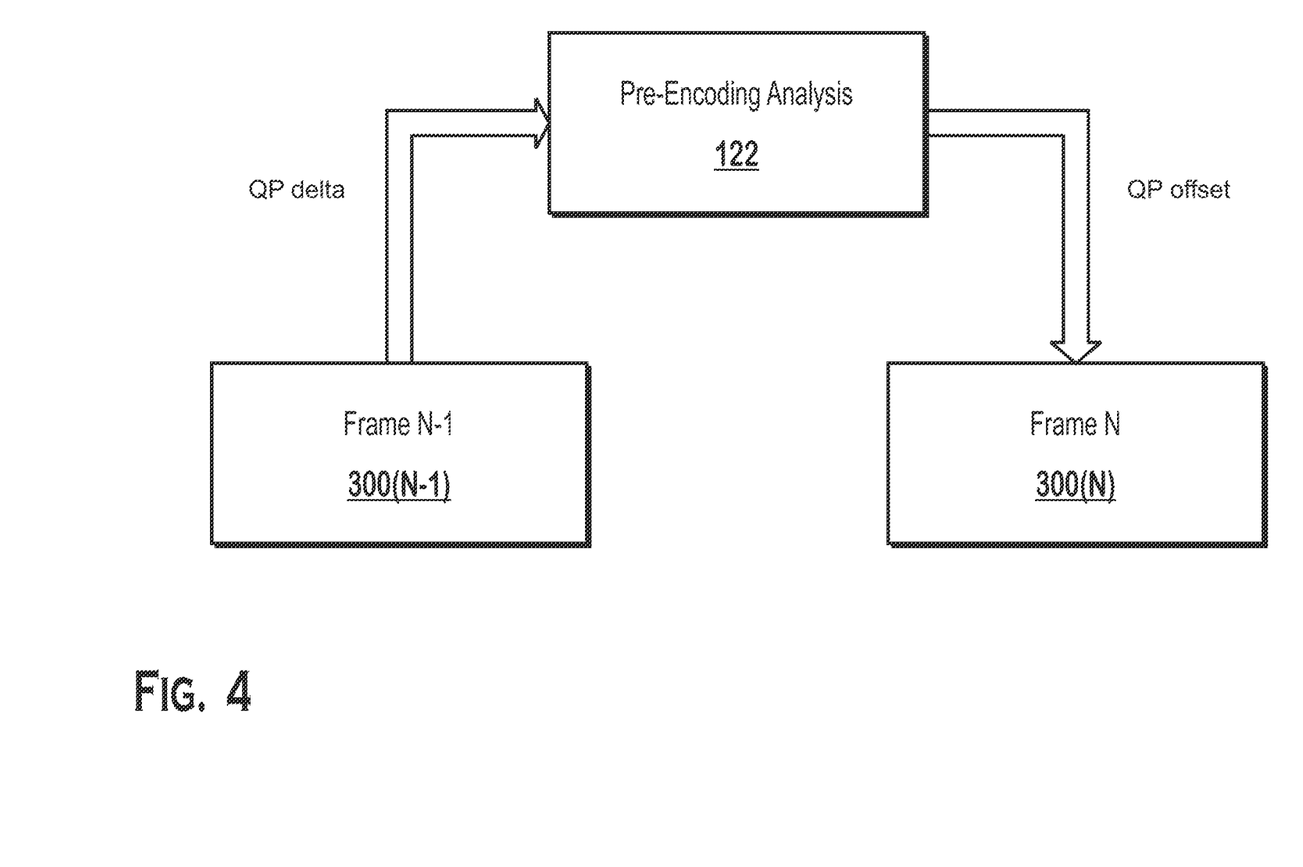
FIG. 4 illustrates an example technique for determining the offset for a frame of video.

Thus the pre-encoding analysis block 122 determines the offset dynamically. In general, the pre-encoding analysis block 122 determines the offset as a value that compensates for the deviation from a desired bitrate that is introduced by the deltaQP value above. FIG. 4 illustrates an example technique for determining the offset for frame N 300(N). To determine the offset for frame N 300(N), the pre-encoding analysis block 122 retrieves the deltaQP values for the blocks 302 of the previous frame 300(N-1). Based on these deltaQP values, the pre-encoding analysis block 122 determines a QP offset value for the blocks of frame N 300(N).

In one implementation, the pre-encoding analysis block 122 determines the QP offset value according to the following expression:

$$\text{offset} = \frac{\sum_{i=0}^{i \leq 22} \text{count}_{deltaQP(i)} * \text{delta}Qp_{(i)}}{\text{number of } MB \text{ in a frame}}$$

where:

[0, 22] is the possible delta QP range and
$\text{count}_{delta\_QP(i)}$ is the number of each different delta QP in a frame According to this expression, the offset for the blocks of frame N is calculated as the sum of delta QP values of a frame divided by the number of blocks in the frame. In other words, the offset for frame N is calculated as the average of the delta QPs for frame N-1.

In another implementation, the pre-encoding analysis block 122 determines the QP offset value from frame N-1 that minimizes the following expression:

$$\text{offset} = \arg\min_{1 \leq j \leq total\ MB\ number} \sum_{k=1, J \neq j}^{total\ MB\ number} \|\text{delta}QP_k - \text{delta}QP_j\|$$

In other words, the offset value is equal to deltaQP$_j$, where delta QP$_j$ is selected out of all deltaQPs of the blocks of the previous frame, and is the value that results in the lowest sum of differences between all other deltaQPs of the previous frame and deltaQP$_j$. This value can be seen as the closest deltaQP of the previous frame to the middle or mean of the deltaQPs of the previous frame.

Other techniques for determining the offset of a frame are possible. In general, the proposed adaptive variance based quantization offset techniques make use of adaptive variance based quantization to improve subjective video coding quality while also resolving bitrate overshooting or undershooting issues that can occur with a fixed value offset technique.

Note that although it is stated herein that the pre-encoding analysis block 122 determines delta QP and adaptive variance based quantization offset, it should be understood that in alternative implementations, one or more blocks outside of the encoder 120 alternatively determines such values.

Figure 5:
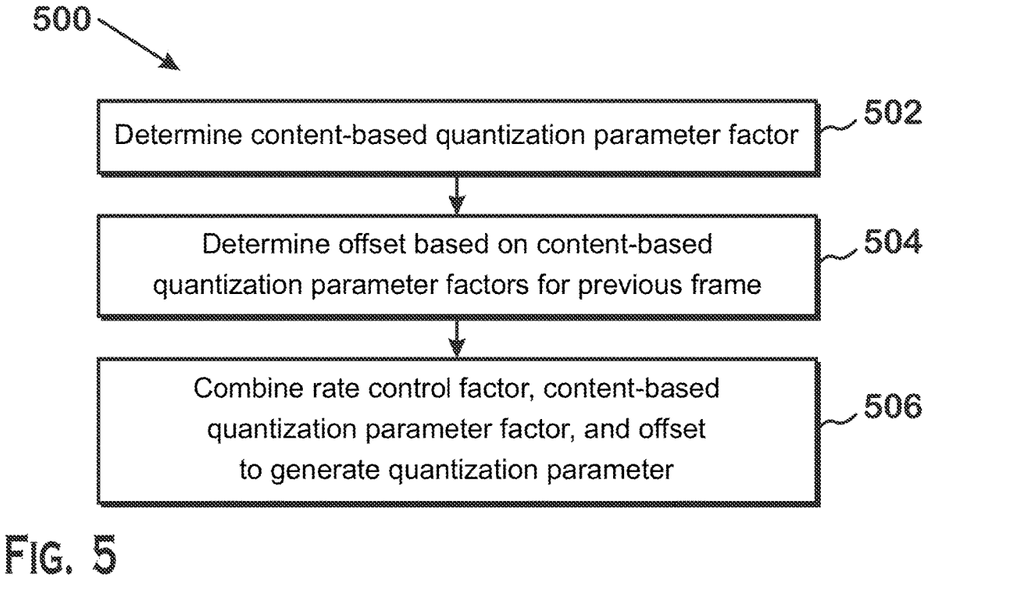
FIG. 5 is a flow diagram of a method for determining a quantization parameter for a block of a frame to be encoded, according to an example.

FIG. 5 is a flow diagram of a method 500 for determining a quantization parameter for a block of a frame to be encoded, according to an example. Although described with respect to the system of FIGS. 1-4, those of skill in the art will recognize that any system, configured to perform the steps of method 500 in any technically feasible order, falls within the scope of the present disclosure.

At step 502, the pre-encoding analysis module 122 determines a content-based quantization parameter factor. In an example, this content-based quantization parameter factor is delta$_{QP}$. Several example techniques for determining deltaQP for a block are described herein.

At step 504, the pre-encoding analysis module 122 determines an offset. The present disclosure provides several example techniques for determining the adaptive offset. In some implementations, the pre-encoding analysis module 122 determines an offset based on deltaQP values from the previous frame. In general, the pre-encoding analysis module 122 determines the offset to "cancel out" the bias introduced by the deltaQP across the entire frame.

At step 506, the pre-encoding analysis module 122 combines a rate control quantization parameter, the content-based quantization parameter factor, and the adaptive offset to generate the quantization parameter for a block. In some examples, this combination is accomplished by adding the control factor, the content-based quantization parameter factor, and the offset together.

Figure 6:
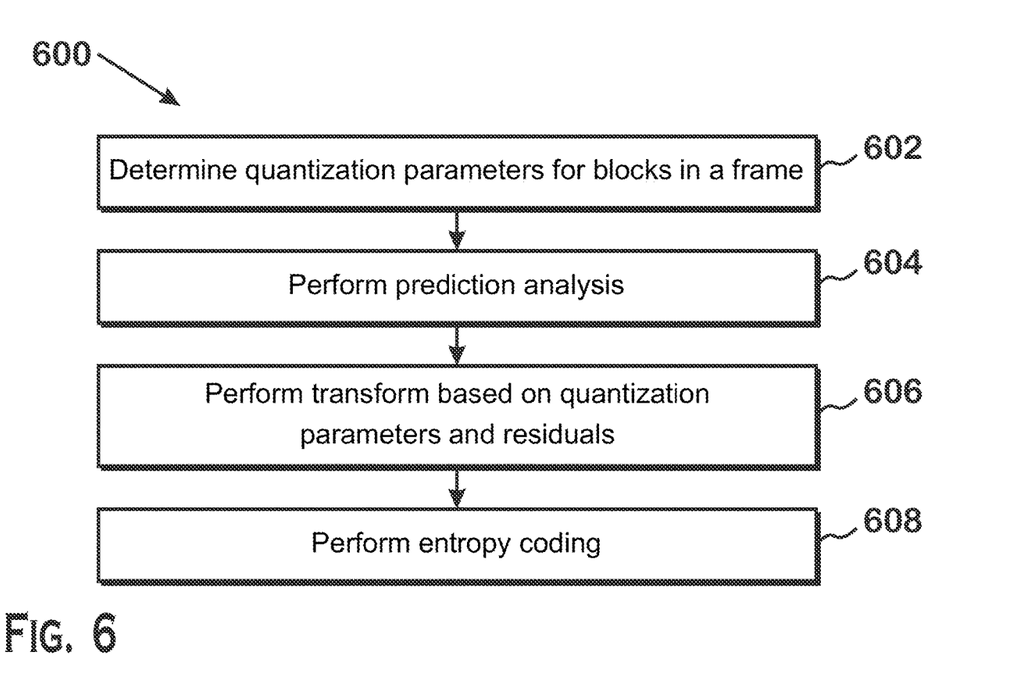
FIG. 6 is a flow diagram of a method for encoding a frame of video, according to an example.

FIG. 6 is a flow diagram of a method 600 for encoding a frame of video, according to an example. Although described with respect to the system of FIGS. 1-4, those of skill in the art will recognize that any system, configured to perform the steps of method 600 in any technically feasible order, falls within the scope of the present disclosure.

The method 600 begins at step 602, where the pre-encoding analysis module 122 determines delta quantization parameters and offsets for blocks in a frame. An example technique for determining delta quantization parameters and offsets for a block of a frame is described in FIG. 5. At step 604, the encoder 120 performs prediction analysis as described elsewhere herein. At step 606, the encoder 120 performs a transform based on the quantization parameters and residuals, as described elsewhere herein. At step 608, the encoder 120 performs entropy coding. After performing entropy coding, the encoded frame is output for use, such as for storage or transmission for decoding or display.

It should be understood that many variations are possible based on the disclosure herein. Although features and elements are described above in particular combinations, in various implementations, each feature or element is used alone without the other features and elements or in various combinations with or without other features and elements.

The various functional units illustrated in the figures and/or described herein (including, but not limited to, the processor 102, the input driver 112, the input devices 108, the output driver 114, the output devices 110, the encoder 120, the decoder 150, the pre-encoding analysis block 122, the prediction block 124, the transform block 126, the entropy encode block 128, the entropy decode block 152, the inverse transform block 154, or the reconstruct block 156) are, in various implenetations, implemented as a general purpose computer, a processor, or a processor core, or as a program, software, or firmware, stored in a non-transitory computer readable medium or in another medium, executable by a general purpose computer, a processor, or a processor core. In particular, in various implementations, the encoder 120 and decoder 150 are implemented as any of software executing on a hardware processor, a fixed-function hardware processor (e.g., one or more circuits), or as a combination of fixed-function hardware and software. Any of the blocks within the encoder 120 and decoder 150, including the encoder 120, the decoder 150, the pre-encoding analysis block 122, the prediction block 124, the transform block 126, the entropy encode block 128, the entropy decode block 152, the inverse transform block 154, or the reconstruct block 156 are, in various implementations, implemented as any of software executing on a hardware processor, a fixed-function hardware processor (e.g., one or more circuits), or as a combination of fixed-function hardware and software. The methods provided are, in various implementations, implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors are, in various implementations, manufactured by configuring a manufacturing process using the results of processed hardware description language (HDL) instructions and other intermediary data including netlists (such instructions capable of being stored on a computer readable media). The results of such processing are, in some implementations, maskworks that are then used in a semiconductor manufacturing process to manufacture a processor which implements aspects of the embodiments.

The methods or flow charts provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for generating a quantization parameter for a block of a current frame of video, the method comprising:
   obtaining a rate control factor for the quantization parameter for a current frame;
   determining a content-based factor for the quantization parameter for the current frame;
   determining an adaptive offset based on content-based factors for a frame prior to the current frame, wherein the content-based factors include a plurality of delta quantization parameter values, wherein each delta quantization parameter value of the plurality of delta quantization parameter values is associated with a different block of the frame prior to the current frame;
   summing the rate control factor, the content-based factor, and the offset to generate the quantization parameter: and
   encoding the current frame using the quantization parameter.

2. The method of claim 1, wherein determining the content-based factor comprises determining the content-based factor based on pixel component values of pixels of the block.

3. The method of claim 2, wherein the content-based factor comprises a variance of the pixel component values.

4. The method of claim 1, wherein determining the adaptive offset comprises:
   determining the adaptive offset as an offset that compensates for a modification to the quantization parameter derived from the content-based factor.

5. The method of claim 1, wherein determining the adaptive offset comprises:
   determining the adaptive offset as the median content-based factor from the frame prior to the current frame.

6. The method of claim 1, wherein determining the adaptive offset comprises:
   determining the offset as the mean of the content-based factor from the frame prior to the current frame.

7. The method of claim 1, wherein the frame prior to the current frame is immediately prior to the current frame.

8. The method of claim 1, wherein encoding the current frame includes, a transform step that includes quantizing the block with coefficients based on the quantization parameter.

9. An encoder for encoding video, the encoder comprising:
   a pre-encoding analysis block configured to:
      determine a content-based factor for a block of a current frame of video for a current frame; and
      determine an adaptive offset based on content-based factors for a frame prior to the current frame, wherein the content-based factors include a plurality of delta quantization parameter values, wherein each delta quantization parameter value of the plurality of delta quantization parameter values is associated with a different block of the frame prior to the current frame;
   a transform block configured to:
      obtain a rate control factor for the block of the current frame of video for the current frame;
      sum the rate control factor, the content-based factor, and the offset to generate a quantization parameter, and
      transform pixel data of the block to a compressed format using the quantization parameter; and
   an entropy encode block configured to encode the block into an encoded format.

10. The encoder of claim 9, wherein determining the content-based factor comprises determining the content-based factor based on pixel component values of pixels of the block.

11. The encoder of claim 10, wherein the content-based factor comprises a variance of the pixel component values.

12. The encoder of claim 9, wherein determining the adaptive offset comprises determining the adaptive offset as an offset that compensates for a modification to the quantization parameter derived from the content-based factor.

13. The encoder of claim 9, wherein determining the adaptive offset comprises:
determining the adaptive offset as the median content-based factor from the frame prior to the current frame.

14. The encoder of claim 9, wherein determining the adaptive offset comprises:
determining the offset as the mean of the content-based from the frame prior to the current frame.

15. The encoder of claim 9, wherein the frame prior to the current frame is immediately prior to the current frame.

16. A non-transitory computer-readable medium storing instructions that, when executed by a processor, cause the processor to generate a quantization parameter for a block of a current frame of video, by:
obtaining a rate control factor for the quantization parameter for a current frame;
determining a content-based factor for the quantization parameter for the current frame;
determining an adaptive offset based on content-based factors for a frame prior to the current frame, wherein the content-based quantization parameter factors include a plurality of delta quantization parameter values, wherein each delta quantization parameter value of the plurality of delta quantization parameter values is associated with a different block of the frame prior to the current frame;
summing the rate control factor, the content-based factor, and the offset to generate the quantization parameter: and
encoding the current frame using the quantization parameter.

17. The non-transitory computer-readable medium of claim 16, wherein determining the content-based factor comprises determining the content-based quantization parameter factor based on pixel component values of pixels of the block.

18. The non-transitory computer-readable medium of claim 17, wherein the content-based factor comprises a variance of the pixel component values.

19. The non-transitory computer-readable medium of claim 16, wherein determining the adaptive offset comprises:
determining the adaptive offset as an offset that compensates for a modification to the quantization parameter derived from the content-based factor.

20. The non-transitory computer-readable medium of claim 16, wherein determining the adaptive offset comprises:
determining the adaptive offset as the median content-based factor from the frame prior to the current frame.

* * * * *